United States Patent [19]

Muroi

[11] Patent Number: 4,928,279
[45] Date of Patent: May 22, 1990

[54] AUTOMATIC POS LOOP SWITCHING APPARATUS

[75] Inventor: Hidenori Muroi, Shizuoka, Japan

[73] Assignee: Tokyo Electric Co., Ltd., Tokyo, Japan

[21] Appl. No.: 26,289

[22] Filed: Mar. 16, 1987

[30] Foreign Application Priority Data

Mar. 27, 1986 [JP] Japan .................................. 61-69241

[51] Int. Cl.$^5$ ............................................. G06F 11/20
[52] U.S. Cl. .................................... 371/11.2; 371/9.1; 371/8.2
[58] Field of Search .................. 371/8, 11, 9, 8.1, 8.2, 371/9.1, 11.1, 11.2, 11.3; 364/200, 900, 187; 340/825.05

[56] References Cited

U.S. PATENT DOCUMENTS

| 4,006,456 | 2/1977 | Wilk . | |
|---|---|---|---|
| 4,231,015 | 10/1980 | Union | 371/11 X |
| 4,354,267 | 10/1982 | Mori | 371/11 |
| 4,623,884 | 11/1986 | Ihara | 371/62 X |
| 4,633,468 | 12/1986 | Skatrud | 371/11 X |
| 4,713,811 | 12/1987 | Frey | 371/11 X |

FOREIGN PATENT DOCUMENTS 43039 3/1986 Japan .

Primary Examiner—Jerry Smith
Assistant Examiner—Robert W. Beausoliel
Attorney, Agent, or Firm—Frishauf, Holtz, Goodman & Woodward

[57] ABSTRACT

A POS loop switching apparatus includes a switching circuit for selectively connecting first and second transmission lines, to which at least one Point Of Sales (POS) terminal is connected, and first and second file control means for periodically supplying a control signal, so as to constitute at least one closed loop, and switch control means for supplying a first switching signal to a switching circuit, in response to control signals from the first and second file control means, to cause the switching circuit to connect the first and second file control means respectively to the first and second transmission lines, thereby to constitute first and second closed loops, and when one of the first and second file control means does not generate a control signal over a predetermined period of time, for supplying a second switching signal to the switching circuit, to cause the switching circuit to connect one of first and second transmission lines connected to the file control means which does not generate the control signal, to the other file control means, so as to constitute a new closed loop by the transmission line, the other file control means, and the other transmission line which was connected to the other file control means.

15 Claims, 3 Drawing Sheets

AUTOMATIC POS LOOP SWITCHING APPARATUS

BACKGROUND OF THE INVENTION

The present invention relates to an automatic POS loop switching apparatus including a plurality of file control sections to which a plurality of Point Of Sales (POS) loops are connected, by means of a switching circuit.

Some POS systems used by the distribution industry have two file control sections, 1A and 1B, and POS loops, 4A and 4B, obtained by connecting a plurality of POS terminals 2A and 2B respectively to sections 1A and 1B via transmission lines 3A and 3B, so as to form closed loops, as shown in FIG. 1.

When, in a POS system of this type, an article code of an item on sale is input to, for example, terminal 2A of loop 4A, by means of, say, a keying operation, the article code together with an inherent address are supplied, as an inquiry signal, to section 1A. Section 1A specifies the POS terminal in accordance with the inherent address thereof, and supplies article data such as the name of the item and its unit price, corresponding to the received article code, to terminal 2A. Terminal 2A executes sales registration processing in accordance with the article data received, and supplies sales data such as the number of solid items and sales amount to section 1A. Section 1A totals the received sales data in a totaling file, in units of, for example, article codes.

In addition, each data is generally transmitted between sections 1A and 1B and terminals 2A and 2B, in synchronism with a polling signal (control signal) supplied at a constant period from sections 1A and 1B.

However, the POS system having the above arrangement has the following problem:

When one of sections 1A and 1B malfunctions, terminal 2A or 2B which constitutes loop 4A or 4B, connected to the malfunctioning one of sections 1A and 1B, cannot then inquire about article data to the affected section 1A or 1B. In short, therefore, terminal 2A or 2B corresponding to the malfunctioning section 1A or 1B cannot perform sales registration processing.

SUMMARY OF THE INVENTION

It is an object of the present invention to provide an automatic POS loop switching apparatus which can automatically switch a POS loop connected to a malfunctioning file control section to one which is operating normally, so that all the POS terminals can continue to be used in spite of the malfunctioning of one of the file control sections, thereby improving the reliability of the entire system.

The above object can be achieved by an automatic POS loop control apparatus comprising: a plurality of transmission lines, to each of which at least one POS terminal is connected; a plurality of file control sections for periodically supplying a control signal; a switching circuit for selectively connecting the transmission lines and the file control sections so as to constitute at least one closed loop; and a switch control circuit for supplying a first switching signal to the switching circuit, in response to output signals from the file control sections, so that the switching circuit connects the file control sections to the corresponding transmission lines, thereby to constitute a plurality of closed loops, and when one of the file control sections does not generate a control signal over a predetermined period of time, for supplying a second switching signal to the switching circuit, so that the switching circuit connects one of the transmission lines connected to the file control section which has not generated a control signal to another file control section, in order to cause the transmission line, the other file control section, and the other transmission line connected thereto to constitute a new closed loop.

According to the present invention, even when a file control section malfunctions, a transmission line connected thereto can be disconnected therefrom and inserted into a closed loop constituted by another, fully functioning, file control section and its corresponding transmission line. As a result, an article code from a POS terminal connected to the inserted transmission line can then be processed by the properly functioning file control section.

DETAILED DESCRIPTION OF THE PREFERRED EMBODIMENT

Figure 1:
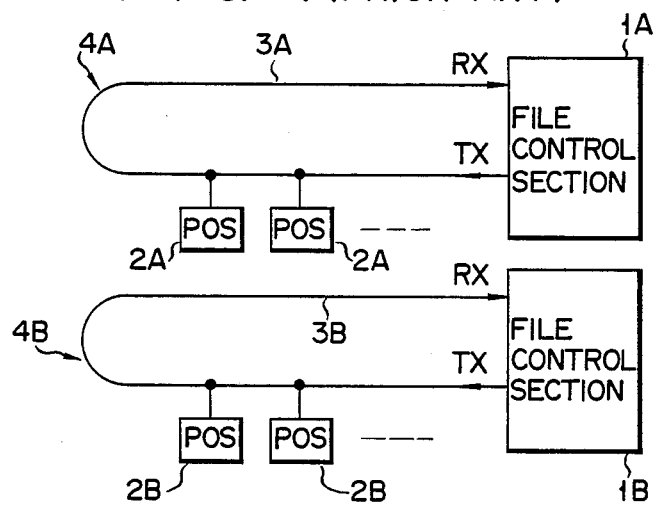
FIG. 1 is a schematic view of a POS system including a plurality of POS loops.
Figure 2:
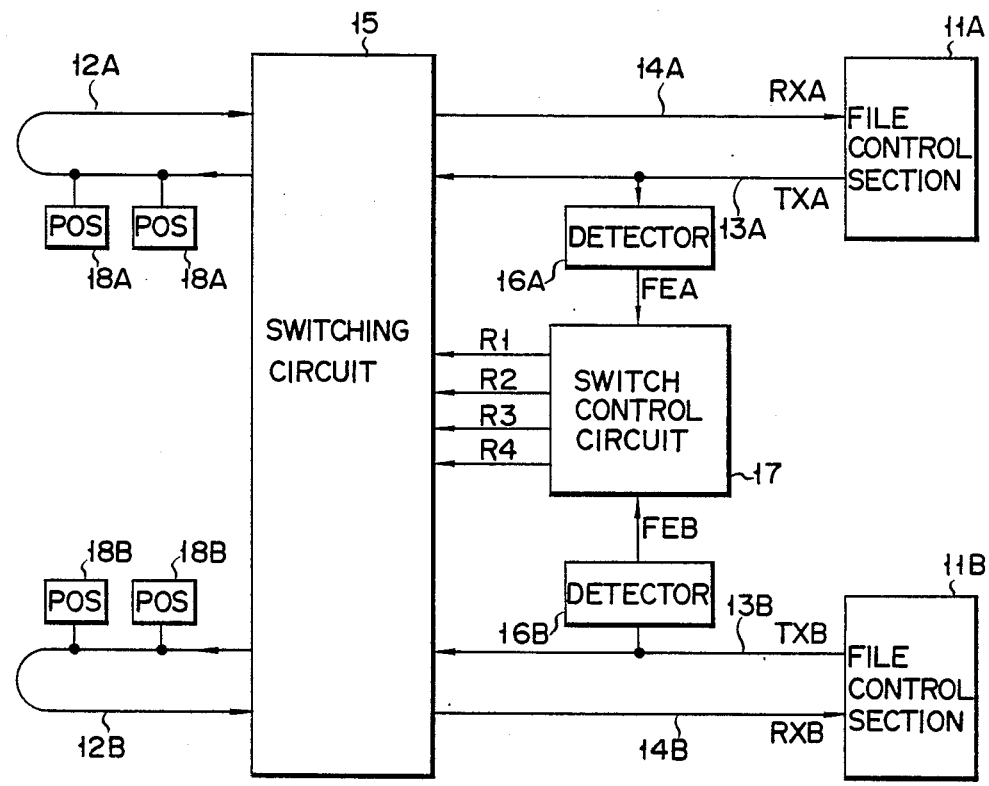
FIG. 2 is a schematic view of a POS system including a POS loop switching apparatus according to an embodiment of the present invention.

FIG. 2 is a block diagram of an automatic POS loop switching apparatus according to an embodiment of the present invention. The apparatus includes file control sections 11A and 11B respectively controlling POS loops 12A and 12B. Sections 11A and 11B are connected to loops 12A and 12B respectively via signal output lines 13A and 13B and signal input lines 14A and 14B for transmitting control signals TXA, TXB, RXA, and RXB, and switching circuit 15. Detectors 16A and 16B are connected to lines 13A and 13B so as to detect whether sections 11A and 11B are malfunctioning, detection being based on whether a control signal (polling signal) is supplied from each of sections 11A and 11B, at a predetermined interval. Malfunction detection signals FEA and FEB are respectively supplied from detectors 16A and 16B to switch control circuit 17 for switching connections between sections 11A and 11B and loops 12A and 12B. In accordance with the levels of signals FEA and FEB input thereto, circuit 17 supplies control signals R1, R2, R3, and R4 to circuit 15, so as to control 4 relays which constitute circuit 15. A plurality of POS terminals 18A and 18B are respectively connected to loops 12A and 12B.

Sections 11A and 11B respectively have memory areas (not shown) corresponding to the inherent addresses of terminals 18A and 18B, and write article data in the memory areas specified by these addresses, regardless of whether an article code is supplied to terminal 18A or 18B.

Figure 3:
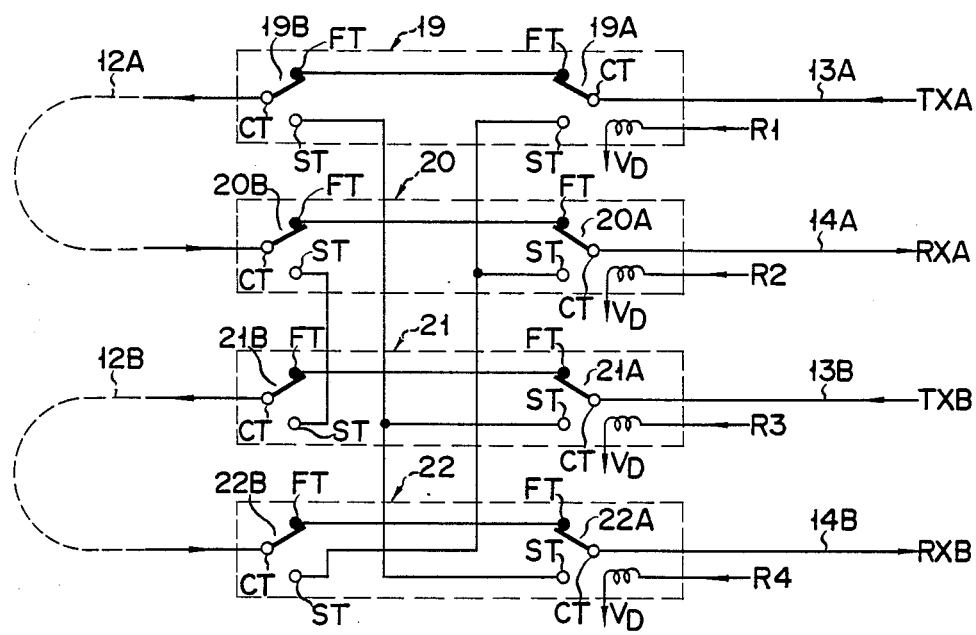
FIG. 3 is a circuit diagram showing in detail a switching circuit of the POS loop switching apparatus shown in FIG. 2.

As is shown in FIG. 3, switching circuit 15 comprises four relays 19, 20, 21, and 22 respectively driven by signals R1, R2, R3, and R4 output from switch control circuit 17. Relays 19, 20, 21, and 22 respectively have two switches 19A and 19B; 20A and 20B; 21A and 21B; and 22A and 22B, simultaneously driven by signals R1 to R4. Switches 19A to 22B are connected to first SW terminal FT when signals R1 to R4 are at H level, and are connected to second SW terminal ST when signals R1 to R4 are at L level. Normally, signals R1 to R4 are set at H level; therefore, switches 19A to 22B are connected to terminal FT.

Common terminals CT of switches 19A and 20A of relays 19 and 20 at the side of section 11A are respectively connected to lines 13A and 14A, and common terminals CT of switches 19B and 20B are connected to the transmission lines of loop 12A. Similarly, common terminals CT of switches 21A and 22A of relays 21 and 22 at the side of section 11B are connected to lines 13B and 14B, and common terminals CT of switches 21B and 22B are connected to the transmission lines of loop 12B.

Terminals FT of the switches of relays 19 to 22 are connected to each other. Terminals ST of contacts 19B, 21A, and 22A are connected to each other, and terminals ST of switches 19A, 20A, and 22B are connected to each other. Terminals ST of switches 20B and 21B are connected to each other.

Figure 4:
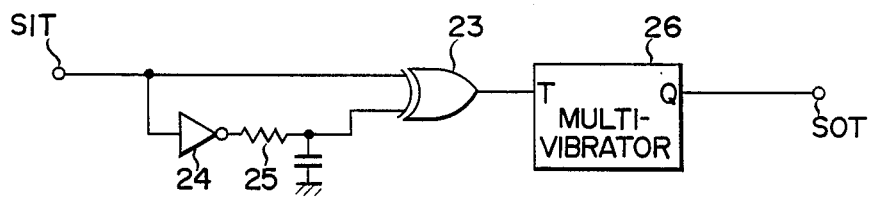
FIG. 4 is a circuit diagram of a malfunction detector of the POS loop switching apparatus shown in FIG. 2.

Detectors 16A and 16B shown in FIG. 2 are arranged as shown in FIG. 4. That is, a control signal (TXA or TXB) supplied from section 11A or 11B and flowing through line 13A or 13B is input directly to one input terminal of exclusive OR circuit 23, via signal input terminal SIT, and is also input to the other input terminal of circuit 23 via inverter 24 and integrating circuit 25 including a resistor and a capacitor. An output signal from circuit 23 is input to a trigger terminal (T) of retrigger type monostable multivibrator 26. In response to a trigger signal of H level at its terminal T, multivibrator 26 supplies a signal, which is at H level for a predetermined time (limit time T) from the input timing, from Q terminal to signal output terminal SOT. In this embodiment, limit time T is set to 5 seconds. Therefore, when the level of signal TXA or TXB input to terminal SIT of detector 16A or 16B varies, a pulse signal of H level is output from circuit 23. As a result, multivibrator 26 is operated to output a signal of H level, via terminal SOT, for only 5 seconds after the signal level changes. That is, when the level of the control signal changes during a period of 5 seconds or less, an output signal is always kept at H level. However, when the control signal is not output for more than 5 seconds, corresponding detector 16A or 16B outputs a signal FEA or FEB at L level. Note that during normal operation, the control signal (polling signal) supplied from sections 11A and 11B is not stopped for more than 5 seconds.

Figure 5:
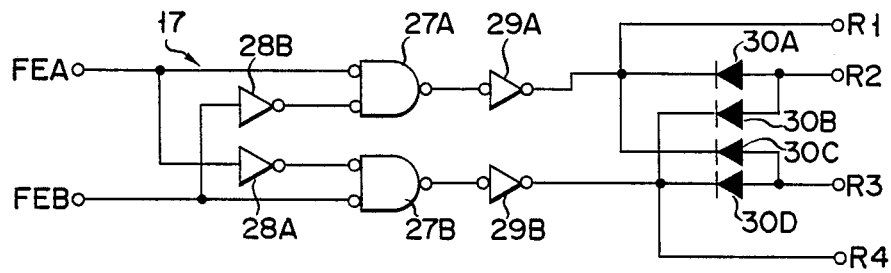
FIG. 5 is a circuit diagram of a switch control circuit of the POS loop switching apparatus shown FIG. 2.

An arrangement of switch control circuit 17 is as shown in FIG. 5. Signals FEA and FEB supplied from detectors 16A and 16B are input to one input terminal of each of OR gates 27A and 27B, respectively, and are also input to the other input terminal of each of the other OR gates 27A and 27B, via inverters 28A and 28B. Output signals from OR gates 27A and 27B are respectively input to open collector type inverters 29A and 29B. Output signals from inverters 29A and 29B are input to circuit 15, as signals R1 and R4, respectively. In addition, output signals from inverters 29A and 29B are respectively output as control signals R2 and R3, via diodes 30A and 30D having the polarities shown in FIG. 5.

Therefore, when both sections 11A and 11B of circuit 17 of FIG. 5 are operating normally, i.e., when signals FEA and FEB are both at H level, the output signals from gates 27A and 27B are both set at H level, so that signals R1 to R4 may also be set at H level. When only section 11A malfunctions, then only signal FEA goes to L level. In this case, since an output signal from gate 27A is set at L level and an output signal from gate 27B is set to H level, signals R1 to R3 are set at L level, and only signal R4 is set at H level. Conversely, when only section 11B malfunctions, signals R2 to R4 is set to L level, and only signal R1 is set to H.

Note that when sections 11A and 11B both malfunction at the same time, signals FEA and FEB are both set to L level, and output signals from gates 27A and 27B are both set to H level, so that signals R1 and R4 remain at H level, as in the case where sections 11A and 11B are both operating normally.

An operation of the automatic POS loop switching apparatus having the above arrangement will now be described below.

First, when they are operating normally, file control sections 11A and 11B supply control signals (polling signals) within a period of limit time (T = 5 sec) to POS loops 12A and 12B, so that malfunction detection signals FEA and FEB of L level are not output from detectors 16A and 16B. This causes control signals R1 to R4 of H level to be supplied from switch control circuit 17. Therefore, relays 19 to 22 of switching circuit 15 are not operated. As a result, as is shown in FIG. 3, relay switches 19A to 22B remain connected to first SW terminals FT. At this time, sections 11A and 11B are connected to loops 12A and 12B, respectively. In this case, in a manner similar to the conventional case, article codes input to POS terminals 18A and 18B, together with inherent addresses, are supplied to sections 11A and 11B, respectively, and are processed therein.

Figure 6:
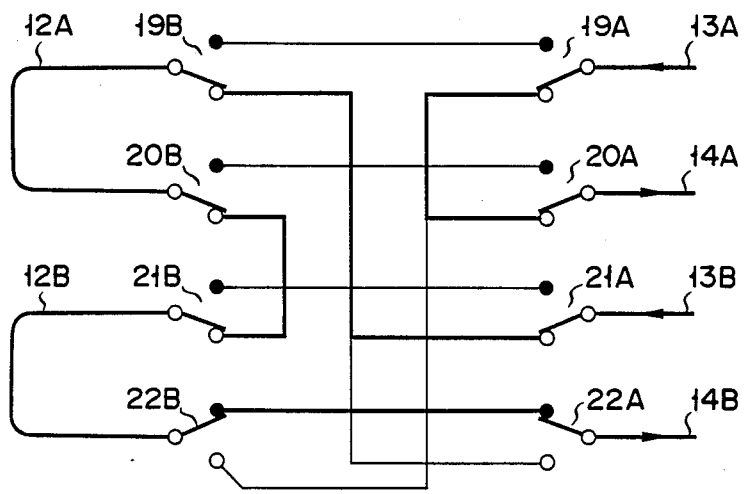
FIGS. 6 and 7 are circuit diagrams showing states of a switching circuit when different file control sections in the POS system shown in FIG. 2 malfunction.

When only section 11A malfunctions, a control signal is no longer generated therefrom. As a result, a malfunction detection signal FEA at L level is output from detector 16, five seconds after section 11A has begun to malfunction. Accordingly, signals R1 to R3 supplied from circuit 17 are set to L level, and only signal R4 remains at H level. Therefore, as is shown in FIG. 6, relays 19, 20, and 21 of circuit 15 are operated to connect switches 19A, 19B, 20A, 20B, 21A, and 21B to second terminals ST, and switches 22A and 22B of relay 22 are kept connected to terminals FT. However, as is shown in FIG. 6, signal output line 13A and signal input line 14A of malfunctioned section 11A are completely disconnected from loop 12A. At the same time, loops 12A and 12B are connected in series via switches 20B and 21B. Two POS loops are connected to fully functioning section 11B, as a new single POS loop, so as to form a closed loop. Thus, a normal sales registration operation can continue to be performed at terminals 18A of loop 12A. That is, article codes input to terminals 18A are supplied, together with inherent addresses, to section 11B, and are processed therein as in section 11A. In this case, article codes input to terminals 18B can be processed, in the same manner, in section 11B.

Figure 7:
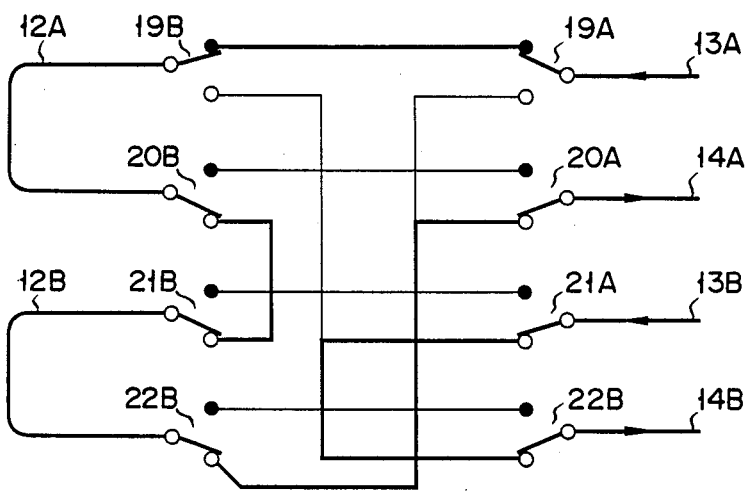

Conversely, when only section 11B malfunctions, signal FEB of L level is generated from detector 16B, so that signals R2 to R4 output from circuit 17 are set to L level and only signal R1 is set to H level. In this case, as is shown in FIG. 7, relays 20, 21, and 22 of circuit 15 are operated to connect switches 20A, 20B, 21A, 21B, 22A, and 22B to terminals ST, and switches 19A and 19B of relay 19 are kept connected to terminals FT. As a result, malfunctioning section 11B is disconnected from loop 12B, and loops 12A and 12B are connected to section 11A, which is operating normally. Therefore, article codes input to terminal 18A or 18B are supplied, together with inherent addresses, to section 11A and are processed therein.

Note that when sections 11A and 11B both malfunction, relays 19 to 22 of circuit 15 are not operated.

According to the automatic POS loop switching apparatus having the above arrangement, when either of sections 11A or 11B malfunctions, the POS loop connected to the malfunctioning file control section is automatically switched to the other, fully functioning, file control section, substantially at the time the malfunction occurs. Therefore, even when one of the file control sections malfunctions, POS terminal 18A or 18B, which constitutes POS loop 12A or 12B connected to the malfunctioning file control section, can continue to perform normal sales registration operations. Thus, the reliability of the entire POS system is significantly improved.

Note that the present invention is not limited to the above embodiment. For example, latching relays may be used as relays constituting switching circuit 15. By using the latching relays, even when one of the file control sections malfunctions and the power source of the entire system is cut off with both the POS loops connected to the other control section, the connection state of circuit 15 can be maintained at that in effect prior to the power source being cut off, when the power source is turned on again.

In addition, three or more file control sections may be used, and POS loops may be connected to these file control sections.

What is claimed is:

1. A POS loop switching apparatus comprising:
   switching circuit means for selectively connecting first and second transmission lines, to which at least one Point of Sales (POS) terminal is connected, to first and second file control means which periodically supply a control signal, to constitute at least one closed loop; and
   switch control means coupled to said switching circuit means, said switch control means including:
      means responsive to control signals received from both of said first and second file control means for supplying a first switching signal to said switching circuit means for causing said switching circuit means to connect said first and second file control means respectively to said first and second transmission lines, to thereby constitute first and second closed loops;
      means responsive to one of said first and second file control means not generating a control signal over a predetermined period of time, for supplying a second switching signal to said switching circuit means for causing said switching circuit means to connect one of first and second transmission lines which were connected to said one of said file control means which does not generate the control signal, to the other file control means, to thereby constitute a new closed loop which includes said transmission line, said other file control means, and the other transmission line connected to said other file control means; and
      logic circuit means for supplying, when both output signals from said first and second malfunction detecting means are at said first predetermined level, the same logic signals as logic signals generated when both output signals are at said second predetermined level, to said switching circuit means.

2. A POS loop switching apparatus comprising:
   switching circuit means for selectively connecting first and second transmission lines, to which at least one Point of Sales (POS) terminal is connected, to first and second file control means which periodically supply a control signal, to constitute at least one closed loop; and
   switch control means coupled to said switching circuit means, said switch control means including:
      means responsive to control signals received from both of said first and second file control means for supplying a first switching signal to said switching circuit means for causing said switching circuit means to connect said first and second file control means respectively to said first and second transmission lines, to thereby constitute first and second closed loops;
      means responsive to one of said first and second file control means not generating a control signal over a predetermined period of time, for supplying a second switching signal to said switching circuit means for causing said switching circuit means to connect one of first and second transmission lines which were connected to said one of said file control means which does not generate the control signal, to the other file control means, to thereby constitute a new closed loop which includes said transmission line, said other file control means, and the other transmission line connected to said other file control means;
      gate means responsive to said control signals received from said first and second file control means; and
      diode means coupled to outputs of said gate means, for providing said switching signals.

3. An apparatus according to claim 2, wherein said switch control means includes
   first and second malfunction detecting means, respectively connected to said first and second file control means, for generating a malfunction detection signal when control signals are not generated from said first and second file control means over a predetermined period of time; and
   switch control circuit means for supplying a switch control signal corresponding to one of said first and second malfunction detecting means which generates the malfunction detection signal, for causing said switching circuit means to connect said first and second transmission lines to one of said first and second file control means which is connected to said malfunction detecting means not generating the malfunction detection signal, to form a closed loop.

4. An apparatus according to claim 3, wherein:
   said first and second file control means includes means for generating control signals at an interval of time T; and
   said first and second malfunction detecting means comprise signal generating circuit means for generating a signal of a first predetermined level during a normal operation, and for generating an output signal of a second predetermined level when the interval between said control signals is longer than said interval of time T.

5. An apparatus according to claim 4, wherein said switching circuit means includes a plurality of relay switches.

6. An apparatus according to claim 3, wherein said switching circuit means includes a plurality of relay switches.

7. An apparatus according to claim 2, wherein said switching circuit means includes a plurality of relay switches.

8. An apparatus according to claim 1, wherein said switching circuit means includes a first pair of relay switch means coupled between said first transmission line and said first file control means; and a second pair of relay switch means coupled between said second transmission line and said second file control means; said first and second pair of relay switch means being operable responsive to said switching signals from said switch control means.

9. An apparatus according to claim 8, wherein each of said relay switch means comprises a pair of relay switches each of which has a terminal commonly connected, and another terminal connected to a relay switch of at least one other relay switch means.

10. An apparatus according to claim 9, wherein said first pair of relay switch means is coupled in said first closed loop, and said second pair of relay switch means is coupled in said second closed loop.

11. An apparatus according to claim 2, wherein said gate means comprises a pair of OR gates having inputs for receiving said control signals from said first and second file control means, respectively;
   a first pair of output terminals coupled to respective outputs of said OR gates; and
   a second pair of output terminals coupled to said respective outputs of said OR gates via respective first diodes, said diodes being connected with the same polarity.

12. An apparatus according to claim 11, further comprising two additional diodes coupled respectively between one of the second output terminals and the input of the diode leading to the other second output terminal, said two additional diodes having the same polarity as said first diodes.

13. An apparatus according to claim 3, wherein said switching circuit means includes a first pair of relay switch means coupled between said first transmission line and said first file control means; and a second pair of relay switch means coupled between said second transmission line and said second file control means; said first and second pair of relay switch means being operable responsive to said switching signals from said switch control means.

14. An apparatus according to claim 13, wherein each of said relay switch means comprises a pair of relay switches each of which has a terminal commonly connected, and another terminal connected to a relay switch of at least one other relay switch means.

15. An apparatus according to claim 8, wherein said first pair of relay switch means is coupled in said first closed loop, and said second pair of relay switch means is coupled in said second closed loop.

* * * * *